May 23, 1961     E. A. HENRY     2,985,009
DIFFERENTIAL ACOUSTIC TRANSDUCER
Filed Oct. 11, 1957

2,985,009
DIFFERENTIAL ACOUSTIC TRANSDUCER

Elliott A. Henry, Newtown, Conn., assignor to Sperry Products, Inc., Danbury, Conn., a corporation of New York Filed Oct. 11, 1957, Ser. No. 689,537

5 Claims. (Cl. 73—67.7)

This invention relates to ultrasonic electro-acoustic search units which may take the form of piezo-electric crystals of quartz or barium titanate. More particularly, the invention relates to the type of search unit employed in the inspection of objects by means of pulses transmitted therein. The time interval between the transmission of the pulse and the reception of its reflection from within the object gives an indication of the presence of flaws or of the thickness of the object.

Heretofore it was the practice to transform all reflected vibrational wave trains or impulses into electrical wave trains which were then amplified and displayed as a plot of amplitude vs. time on a cathode ray tube indicator. It is one of the principal objects of this invention to avoid this practice and to provide a search unit which will yield an output to the receiver amplifier only when a defect is encountered within the object under inspection. By this means defective areas may be more rapidly located, small defects may be more readily located, and extreme precision and accuracy are obtained.

Further objects and advantages of this invention will become apparent in the following detailed description thereof.

In the accompanying drawings.

Figure 1:
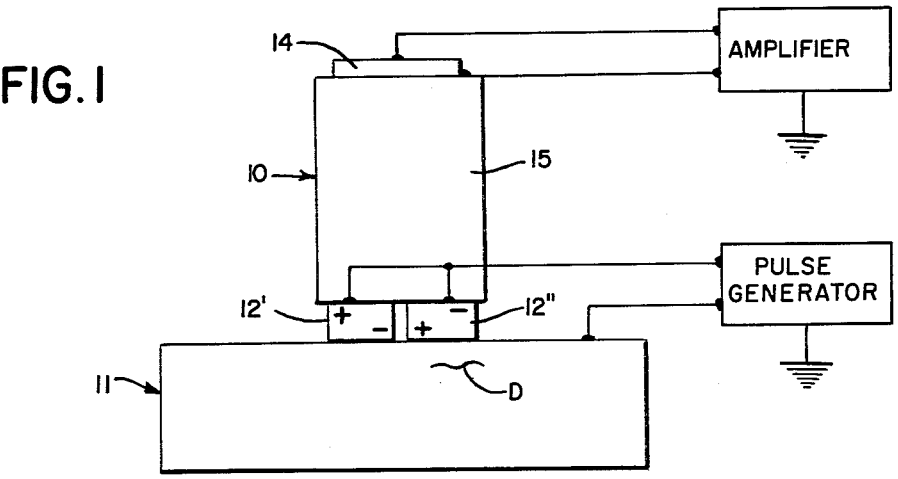
Fig. 1 is a front elevation of one form of transducer embodying my invention, and showing electrical connections.

Referring to Fig. 1 it will be seen that I have disclosed my invention in the form of a tandem search unit, as fully described in my co-pending application Ser. No. 495,507, filed March 21, 1955, now Patent No. 2,888,824. The search unit is indicated generally at 10, in engagement with an object to be inspected and indicated generally at 11. The tandem search unit is characterized by the fact that separate transmitting and receiving piezo-electric elements are provided, but scan the same area, and the elements are separated by a solid or liquid sound conducting medium. Thus in Fig. 1, the transmitting elements are shown as a pair of crystals 12', 12'', while the receiving element is a single crystal 14, the transmitting and receiving crystals being separated by the sound conducting medium 15. The transmitting elements are connected to the pulse generator, and the receiving element is connected to the receiver amplifier. Since the receiving element is not connected to the pulse generator, the amplifier is not subjected to the initial shock and therefore is ready to receive immediately signals due to reflections without the loss of time which would be encountered if the transmitting elements were also the receiving elements and connected directly to the amplifier. Close to surface inspection of objects is therefore made possible by the use of the tandem type of search unit.

However, with all types of search units heretofore employed, including the tandem type, it has been the practice to receive all reflections of the transmitted pulses and to indicate them upon a cathode ray tube. With this practice, so many indications were received that it was not possible to test rapidly or to detect small defects readily. The reason for such action resided in the use of single transmitting and receiving crystals of substantially equal areas. By this invention, I substitute for the single transmitting element heretofore employed, a pair of piezo-electric elements 12' and 12''. These elements are crystals obtained from sectioning a single crystal blank and so cut as to have opposite polarities, but with identical natural frequencies and the same physical dimensions. The crystals 12' and 12'' are connected electrically in parallel and are periodically excited by the electrical pulse generator. The receiving crystal 14 responds to the algebraic sum of the mechanical stresses applied to its face, and the electrical output thereof, which is proportional to the algebraic sum, is applied to the receiver amplifier. The output of the amplifier may be indicated on the usual cathode ray tube, or it may operate an aural or visual indicator such as a meter.

With crystals 12' and 12'' of opposite polarity and excited by a single pulse generator, one crystal expands and the other contracts in response to a pulse energization, the displacements being equal and opposite. Thus the polarity of acoustic waves generated will be 180° out of phase and will produce equal and opposite stresses at the receiving crystal 14. The algebraic sum of these stresses is zero and there will be no voltage generated in the receiving crystal 14. However, if the search unit is acoustically coupled to the object 11, an an internal defect D is in the path of the acoustic wave from one of the transmitting crystals, such as crystal 12'', the echo from the internal defect will reach the receiving crystal 14, but as there will be no echo from the crystal 12' at this time the algebraic sum of the stresses will not be zero but will have a finite magnitude exactly as if crystal 12' were not present.

In the case where defects are present under both transmitting crystals, identical distances below the surfaces but of different areas, the output voltage of the receiving crystal 14 would be proportional to area differences of the two defects. In practice it is found that there will always be differences in response between any two defects, these differences taking the form of differences in frequency, phase, time or amplitude. Thus it may be seen that all fixed echoes from the geometry of the search unit or boundaries of the object under test are cancelled, and only differentials in acoustic responses of the two areas can produce output electrical signals.

Figure 2:
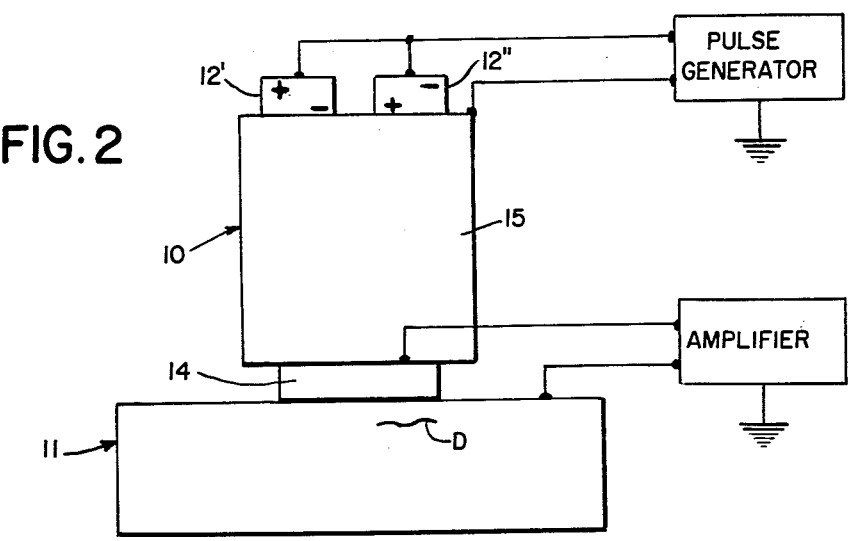
Figs. 2 is a view similar to Fig. 1 showing another form of the invention.

In the Fig. 2 form of the invention, the positions of transmitting and receiving elements are reversed, the receiving element 14 being in contact with the object.

Figure 3:
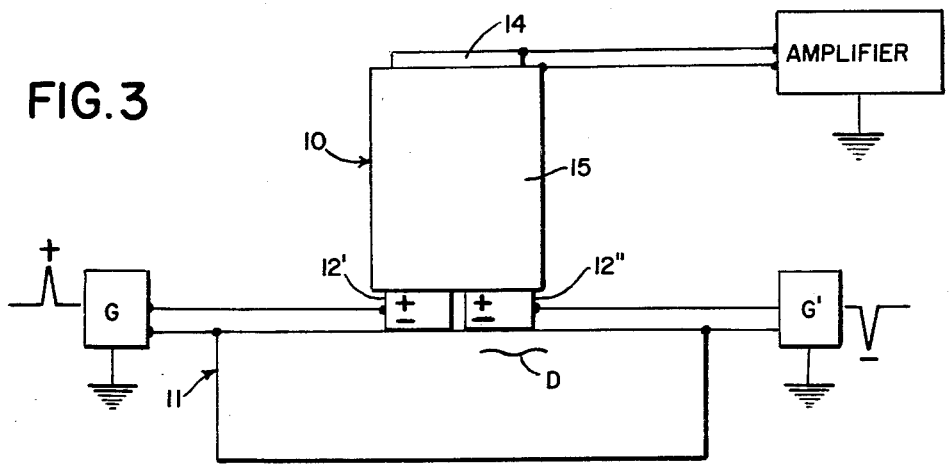
Fig. 3 is a view similar to Fig. 1 showing still another form of the invention.

Another form of the invention is disclosed in Fig. 3 where crystals of the same polarity are employed but the respective crystals are energized from opposite polarity pulse generators which are adjusted to generate equal and opposite pulses.

Having described my invention, what I claim and desire to secure by Letters Patent is:

1. Apparatus for the ultrasonic inspection of objects, comprising a search unit in effective engagement with the object, said unit having transmitting means for propagating pulses into the object, means for energizing the transmitting means with an electric pulse, said transmitting means comprising means for generating in a common plane perpendicular to the direction of transmission into the object a pair of ultrasonic pulses of the same frequencies and equal magnitudes but 180° out of phase when energized by the electric pulse, said search unit comprising also a single receiving means aligned with said transmitting means in the direction of propagation for receiving the returned reflections of said pulses.

2. Apparatus for the ultrasonic inspection of objects as specified in claim 1, in which the means for generating a pair of ultrasonic pulses of equal magnitudes and 180° out of phase when energized by the electric pulse comprises a pair of crystals of the same frequencies but of opposite polarities, and means whereby said electric energizing means energizes said crystals simultaneously and equally.

3. Apparatus for the ultrasonic inspection of objects as specified in claim 1, in which the means for generating a pair of ultrasonic pulses of the same frequencies and equal amplitudes but 180° out of phase comprises a pair of crystals, said electric energizing means comprising means for energizing the respective crystals with pulses of the same frequencies, equal amplitudes and opposite polarities.

4. Apparatus for the ultrasonic inspection of objects as specified in claim 1, in which the means for generating a pair of ultrasonic pulses of the same frequencies and equal amplitudes but 180° out of phase comprises a pair of crystals, said electric energizing means comprising a pair of pulse generators connected to the respective crystals, said pulse generators being adopted to generate electric pulses of the same frequencies and equal amplitudes but 180° out of phase.

5. Apparatus for the ultrasonic inspection of objects, comprising a search unit having piezo-electric transmitting means, piezo-electric receiving means and an acoustic delay means between said transmitting means and said receiving means, one of said piezo-electric means engaging the object, means for energizing the transmitting means with an electric pulse, said transmitting means comprising means for generating in a common plane perpendicular to the direction of transmission into the object a pair of ultrasonic pulses of the same frequencies and equal magnitudes but 180° out of phase when energized by said electric pulse, said piezo-electric receiving means comprising a single element aligned with said transmitting means in the direction of propagation for receiving the reflections of said ultrasonic pulses.

References Cited in the file of this patent

UNITED STATES PATENTS

| | | |
|---|---|---|
| 2,625,035 | Firestone | Jan. 13, 1953 |
| 2,847,853 | Rankin | Aug. 19, 1958 |

FOREIGN PATENTS

| | | |
|---|---|---|
| 638,285 | Great Britain | June 7, 1950 |